(12) United States Patent
Hagihara

(10) Patent No.: US 11,913,778 B2
(45) Date of Patent: Feb. 27, 2024

(54) RECORDING MEDIUM, SHAPE CALCULATION METHOD, AND SHAPE CALCULATION DEVICE

(71) Applicant: Kioxia Corporation, Tokyo (JP)

(72) Inventor: Kazuki Hagihara, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 772 days.

(21) Appl. No.: 17/018,353

(22) Filed: Sep. 11, 2020

(65) Prior Publication Data

US 2021/0285761 A1    Sep. 16, 2021

(30) Foreign Application Priority Data

Mar. 12, 2020    (JP) .................................. 2020-043358

(51) Int. Cl.
*G01B 15/04*    (2006.01)
(52) U.S. Cl.
CPC .................... *G01B 15/04* (2013.01)
(58) Field of Classification Search
None
See application file for complete search history.

(56) References Cited

U.S. PATENT DOCUMENTS

| 8,243,880 | B2 | 8/2012 | Ishibashi |
| 9,863,764 | B2 | 1/2018 | Yamanaka |
| 10,156,435 | B1 | 12/2018 | Taniguchi |
| 2017/0074647 | A1* | 3/2017 | Yamanaka .............. H01L 22/00 |

FOREIGN PATENT DOCUMENTS

| JP | 2011-117894 A | 6/2011 |
| JP | 2017-53828 A | 3/2017 |
| JP | 2019-56568 A | 4/2019 |

* cited by examiner

*Primary Examiner* — Hoon K Song
(74) *Attorney, Agent, or Firm* — Finnegan, Henderson, Farabow, Garrett & Dunner, LLP

(57) ABSTRACT

According to one embodiment, a recording medium records a shape calculation program causing a computer to execute creating a first data frame which is a set of first factors corresponding to a shape to be measured from a first scattering profile obtained by irradiating a first structure on a substrate with an electromagnetic wave, creating a second data frame corresponding to the first data frame from a second scattering profile calculated based on a second structure, the second structure being a structure simulated, fitting the first data frame and the second data frame, and determining the shape of the first structure based on the fitting result.

20 Claims, 12 Drawing Sheets

FIG.8
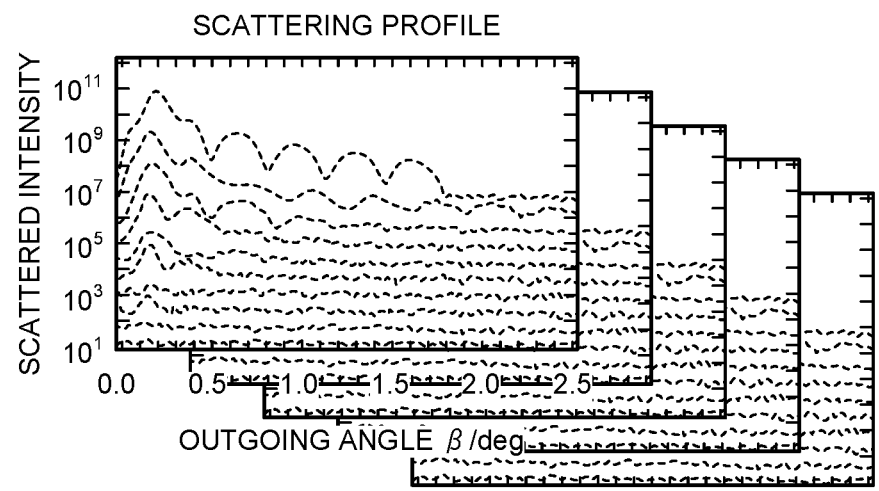
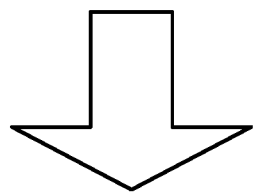
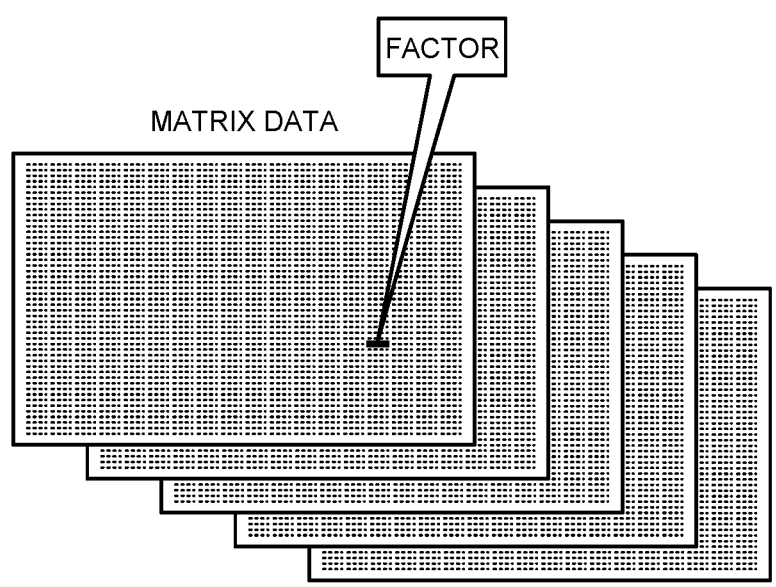

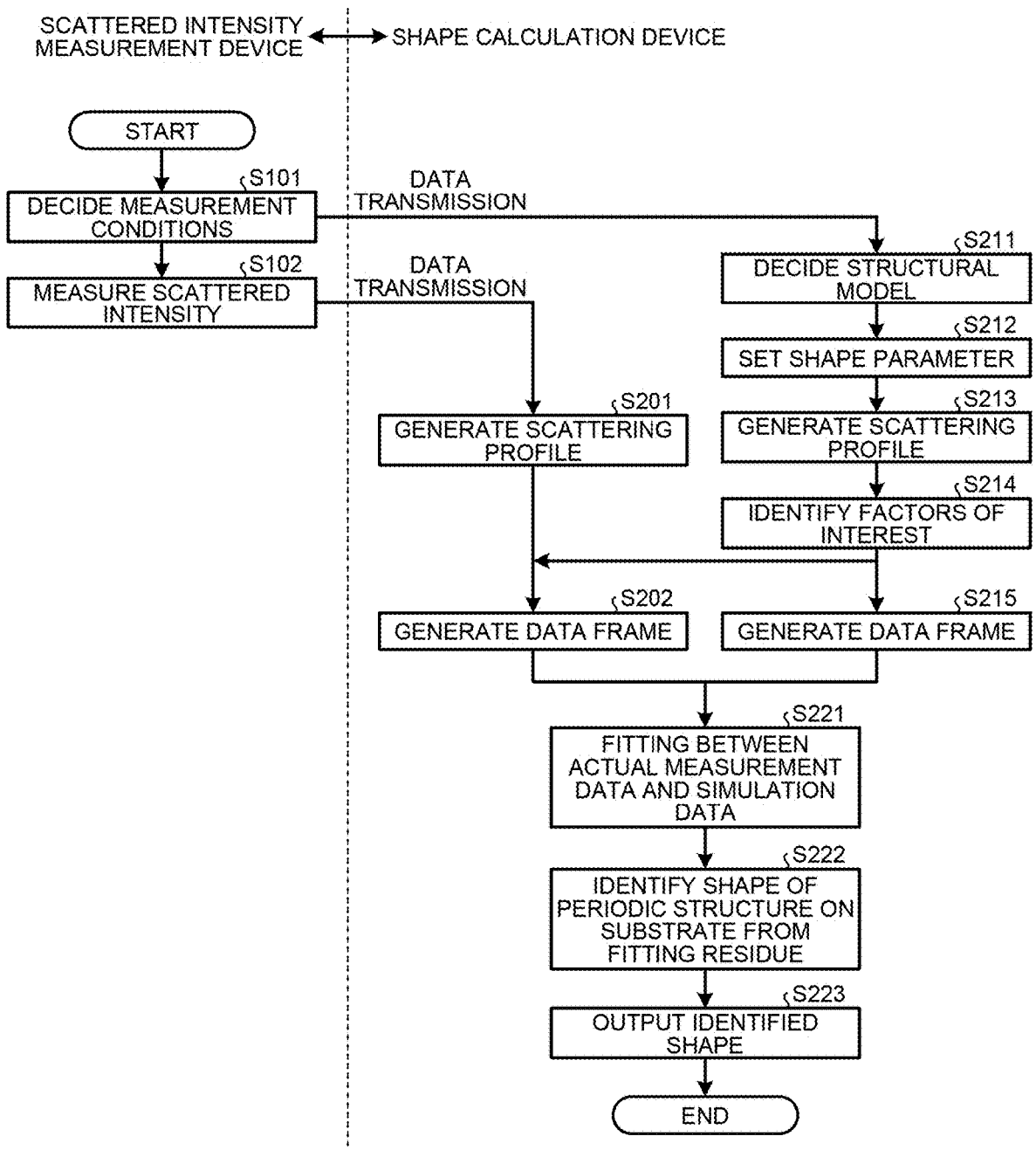

Height

RT

RB

RECORDING MEDIUM, SHAPE CALCULATION METHOD, AND SHAPE CALCULATION DEVICE

CROSS-REFERENCE TO RELATED APPLICATIONS

This application is based upon and claims the benefit of priority from Japanese Patent Application No. 2020-043358, filed on Mar. 12, 2020; the entire contents of which are incorporated herein by reference.

FIELD

Embodiments described herein relate generally to a recording medium, a shape calculation method, and a shape calculation device.

BACKGROUND

In order to analyze a shape of a periodic structure on a substrate, for example, a small angle scattering X-ray method may be used. However, the small angle scattering X-ray method requires fitting of huge waveform data, and thus, sufficient measurement accuracy may not be obtained.

BRIEF DESCRIPTION OF THE DRAWINGS

FIG. 8 is a diagram illustrating a procedure of deriving matrix data from the scattering profile generated by the shape calculation device according to the embodiment;

FIG. 11 is a flowchart illustrating an example of a procedure of shape calculation processing executed by the shape calculation system according to the embodiment;

DETAILED DESCRIPTION

According to one embodiment, a recording medium records a shape calculation program causing a computer to execute creating a first data frame which is a set of first factors corresponding to a shape to be measured from a first scattering profile obtained by irradiating a first structure on a substrate with an electromagnetic wave, creating a second data frame corresponding to the first data frame from a second scattering profile calculated based on a second structure, the second structure being a structure simulated, fitting the first data frame and the second data frame, and determining the shape of the first structure based on the fitting result.

Hereinafter, the present invention will be described in detail with reference to the drawings. The present invention is not limited to the following embodiment. Constituent elements in the following embodiment include those that can be easily assumed by those skilled in the art or those that are substantially the same.

Configuration Example of Shape Calculation System

Figure 1:
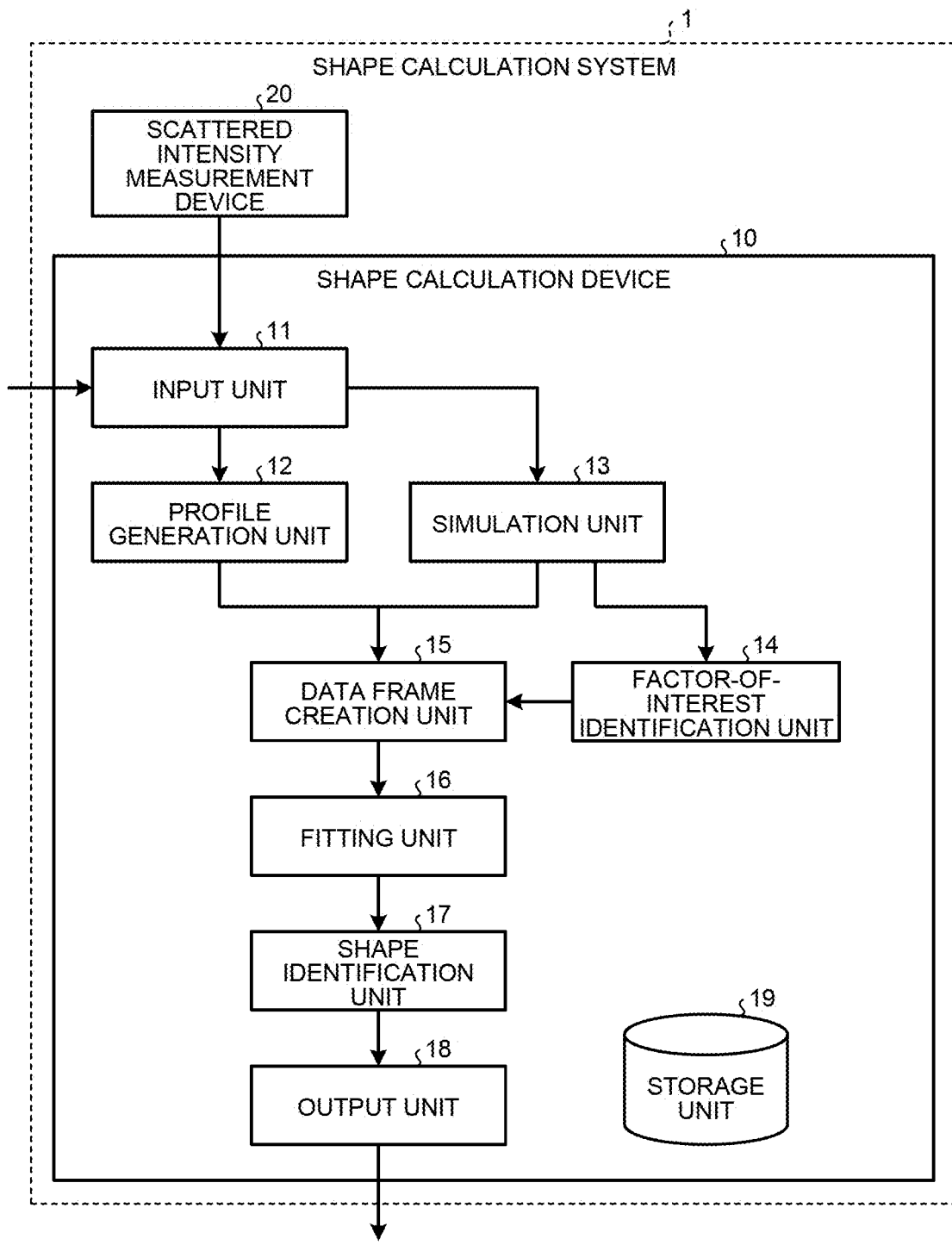
FIG. 1 is a block diagram illustrating an example of a configuration of a shape calculation system according to an embodiment.

FIG. 1 is a block diagram illustrating an example of a configuration of a shape calculation system 1 according to the embodiment. A periodic structure on a substrate such as a semiconductor substrate can be variously changed depending on processing conditions and sudden events. The shape calculation system 1 is a system that analyzes a shape of a periodic structure on a substrate by using, for example, a small angle X-ray scattering (SAXS) method.

As illustrated in FIG. 1, the shape calculation system 1 includes a shape calculation device 10 and a scattered intensity measurement device 20.

The scattered intensity measurement device 20 acquires information on the periodic structure on the substrate by using, for example, the small angle scattering X-ray method. In the small angle scattering X-ray method, scattered intensity data such as a scattering angle and a scattered intensity of an outgoing wave having a diffraction angle of several degrees or less among outgoing waves obtained by causing an X-ray to be incident on the substrate is measured. The scattered intensity data includes information on a unit structure constituting the periodic structure on the substrate.

The shape calculation device 10 calculates the shape of the periodic structure by fitting a scattering profile obtained by irradiating the periodic structure on the substrate with electromagnetic waves such as the X-ray and a scattering profile that may be obtained when a structural model virtually created is irradiated with electromagnetic waves such as the X-ray.

The shape calculation device 10 includes, as functional units for realizing the aforementioned function, an input unit 11, a profile generation unit 12, a simulation unit 13, a factor-of-interest identification unit 14, a data frame creation unit 15, a fitting unit 16, a shape identification unit 17, an output unit 18, and a storage unit 19.

The input unit 11 receives inputs of the scattered intensity data, measurement conditions of the scattered intensity, and the like from the scattered intensity measurement device 20, and sends the inputs to the profile generation unit 12 and the simulation unit 13. In addition, the input unit 11 receives an input of setting information from an external device (not illustrated). The setting information is, for example, profile generation conditions, virtual structure data, and setting conditions of the shape parameter, and is used to calculate the shape of the periodic structure. The input unit 11 sends the profile generation conditions to the profile generation unit 12, and sends the virtual structure data and the setting conditions of the shape parameter to the simulation unit 13.

The profile generation unit 12 as a first profile generation unit generates a scattering profile indicating the scattered intensity at each scattering angle from the scattered intensity data received from the scattered intensity measurement device 20. At this time, the profile generation unit 12 extracts necessary data from the scattered intensity data, and generates the scattering profile according to the profile generation condition.

The simulation unit 13 as a second profile generation unit generates a scattering profile by using a virtually set periodic structure as the periodic structure on the substrate. The virtually set periodic structure is a periodic structure of the structural model (virtual structure) constructed according to the virtual structure data and the setting conditions of the shape parameter. The simulation unit 13 calculates a simulation value of the scattered intensity data obtained when such a periodic structure is actually irradiated with the X-ray, and generates the scattering profile from the calculated simulation value.

The scattering profile obtained by the simulation of the simulation unit 13 is used for fitting with the scattering profile based on the actual measurement generated by the profile generation unit 12 or for identifying factors of interest using the factor-of-interest identification unit 14. The simulation unit 13 sends the scattering profile used for fitting to the data frame creation unit 15, and sends the scattering profile used for identifying the factors of interest to the factor-of-interest identification unit 14. However, both the scattering profiles may be the same.

The factor-of-interest identification unit 14 identifies the factors of interest corresponding to a shape to be measured based on the plurality of scattering profiles generated by the simulation unit 13. The scattering profile includes a plurality of factors each having information on the scattered intensity. The factor-of-interest identification unit 14 identifies, as the factors of interest for the shape to be measured, factors having high sensitivity to the parameter such as factors that greatly vary according to the change of the shape to be measured. The factor-of-interest identification unit 14 sends information on the identified factors of interest to the data frame creation unit 15.

The data frame creation unit 15 creates a data frame in which the identified factors of interest are extracted from the scattering profiles generated by the profile generation unit 12 and the simulation unit 13. That is, the data frame is a set of factors of interest.

The fitting unit 16 performs fitting between the data frame created from the scattering profile generated by the profile generation unit 12 and the data frame created from the scattering profile generated by the simulation unit 13. A result of the fitting by the fitting unit 16 is represented as a fitting residue which is a difference between two data frames, for example. The fitting unit 16 obtains a fitting residue for at least one data frame obtained from the simulation for the data frame based on the actual measurement value.

The shape identification unit 17 identifies, as a shape of an actual periodic structure, a shape corresponding to a simulation value indicating a minimum fitting residue among the fitting residues obtained by the fitting unit 16. The shape identification unit 17 sends, as a calculation result of the shape, data such as the identified shape to the output unit 18.

The output unit 18 outputs the calculation result of the shape from the shape identification unit 17. The output of the calculation result of the shape is performed by, for example, display on a display or by printout by a printer.

The storage unit 19 stores various parameters and various kinds of information necessary for an operation of the shape calculation device 10.

For example, the storage unit 19 stores the scattered intensity data from the scattered intensity measurement device 20 input to the input unit 11, the setting information from the external device, and the like. For example, the storage unit 19 stores the scattering profiles generated by the profile generation unit 12 and the simulation unit 13. For example, the storage unit 19 stores the factors of interest for a predetermined shape identified by the factor-of-interest identification unit 14. For example, the storage unit 19 stores the data frame created by the data frame creation unit 15. For example, the storage unit 19 stores the fitting result such as the fitting residue calculated by the fitting unit 16. For example, the storage unit 19 stores the calculation result of the shape from the shape identification unit 17.

Example of Hardware Configuration of Shape Calculation Device

Figure 2:
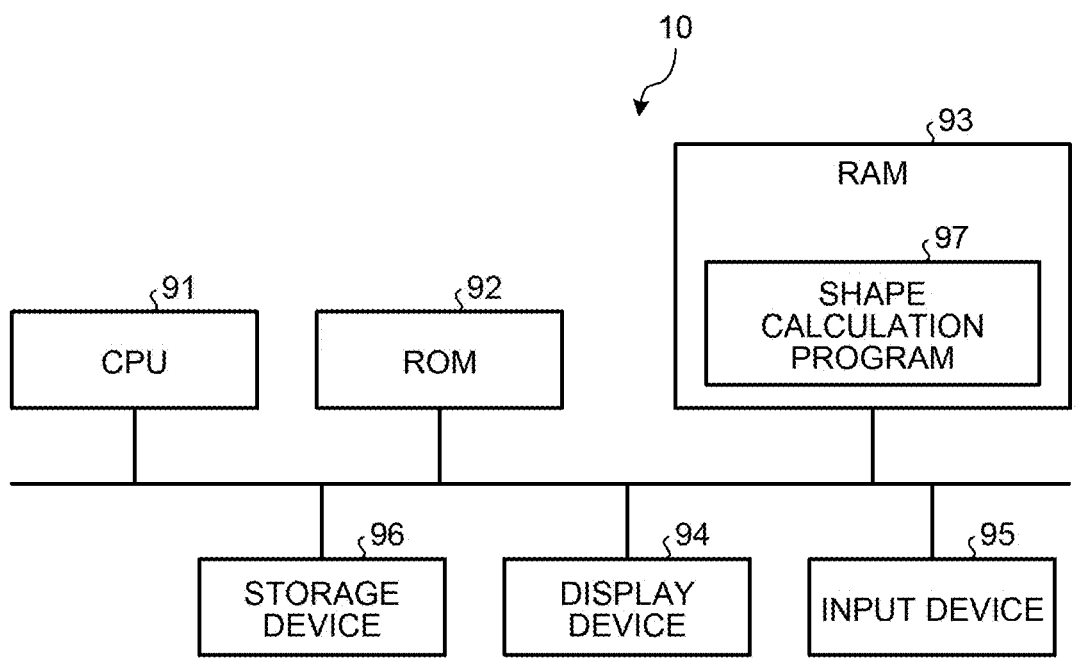
FIG. 2 is a block diagram illustrating an example of a hardware configuration of a shape calculation device according to the embodiment.

Next, a hardware configuration of the shape calculation device 10 according to the embodiment will be described with reference to FIG. 2. FIG. 2 is a block diagram illustrating an example of the hardware configuration of the shape calculation device 10 according to the embodiment.

As illustrated in FIG. 2, the shape calculation device 10 includes a central processing unit (CPU) 91, a read only memory (ROM) 92, a random access memory (RAM) 93, a display device 94, an input device 95, and a storage device 96. The CPU 91, the ROM 92, the RAM 93, the display device 94, the input device 95, and the storage device 96 are connected via a bus line.

The CPU 91 calculates the shape of the periodic structure on the substrate by using a shape calculation program 97 which is a computer program.

The shape calculation program 97 is a computer program product having a nontransitory computer readable recording medium including a plurality of commands for calculating the shape that is executable by a computer.

The shape calculation program 97 is stored in the ROM 92, for example, and is loaded into the RAM 93 via the bus line. FIG. 2 illustrates a state in which the shape calculation program 97 is loaded into the RAM 93.

The CPU 91 executes the shape calculation program 97 loaded into the RAM 93. Specifically, in the shape calculation device 10, the CPU 91 executes various kinds of processing by reading the shape calculation program 97 from the ROM 92 according to an instruction input from the input device 95 by a user and expanding the read shape calculation program into a program storage region of the RAM 93. The CPU 91 temporarily stores various kinds of data generated when the various kinds of processing are executed in a data storage region formed in the RAM 93.

As stated above, the shape calculation program 97 causes the shape calculation device 10 constructed as the computer to execute the calculation of the shape by the plurality of commands. The shape calculation program 97 executed by the shape calculation device 10 has a module configuration including the profile generation unit 12, the simulation unit 13, the factor-of-interest identification unit 14, the data frame creation unit 15, the fitting unit 16, and the shape identification unit 17. These units are loaded into the main storage device, and these units are generated on the main storage device.

The display device 94 is, for example, a liquid crystal display or an organic electro-luminescence (EL) display. The display device 94 functions as the output unit 18 under the control of the CPU 91. However, when the calculation result of the shape of the periodic structure on the substrate can be output, the shape calculation device 10 includes a printer functioning as the output unit 18 under the control of the CPU 91 instead of or in addition to the display device 94.

The input device 95 is, for example, a keyboard and a mouse. The input device 95 may be a touch panel integrated with the display device 94, or the like. The input device 95 functions as the input unit 11 under the control of the CPU 91.

The storage device 96 is, for example, a hard disk drive (HDD) or a solid state drive (SSD). The storage device 96 functions as the storage unit 19 under the control of the CPU 91.

Configuration Example of Scattered Intensity Measurement Device

Figure 3:
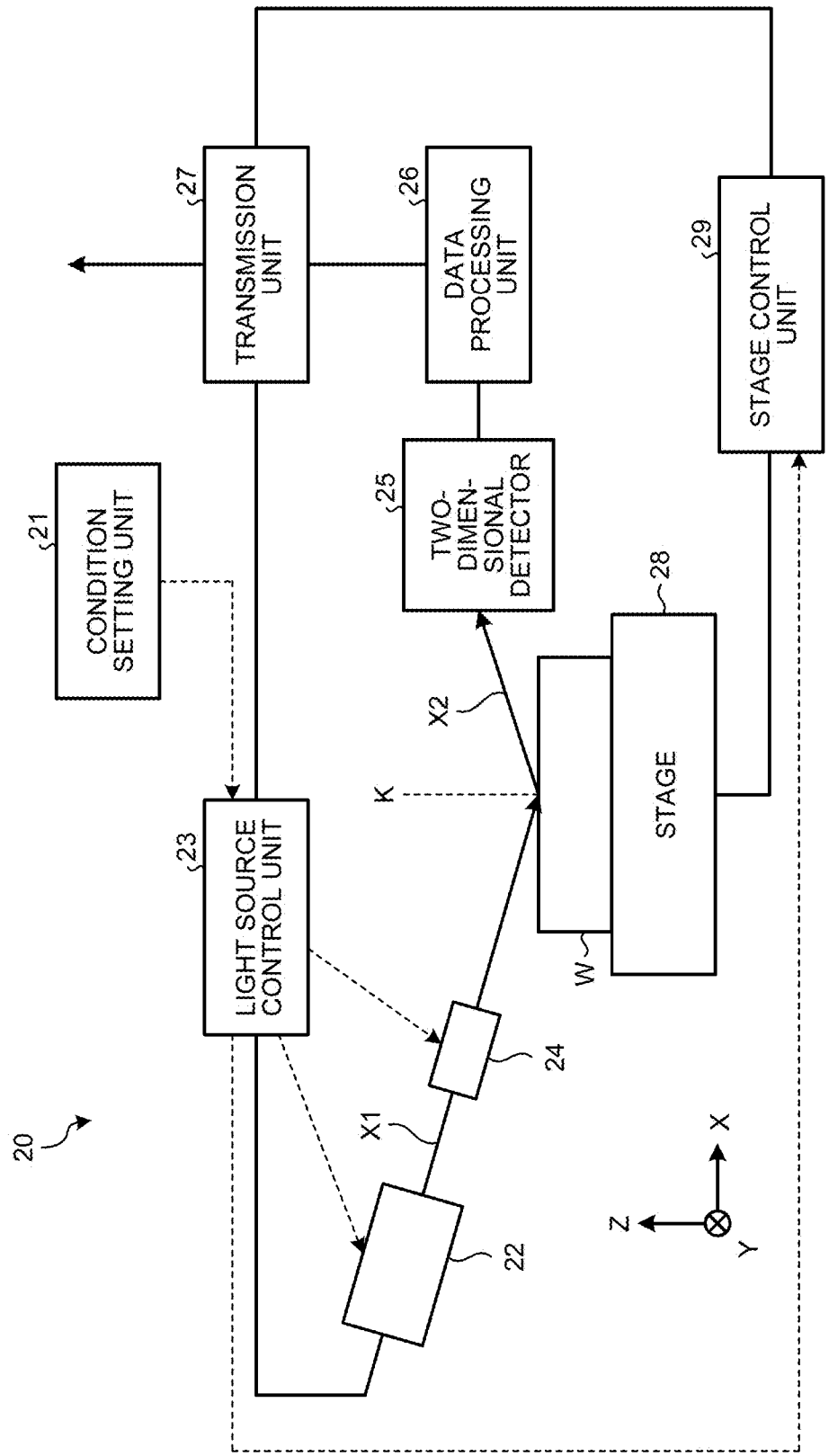
FIG. 3 is a schematic diagram illustrating an example of a configuration of a scattered intensity measurement device according to the embodiment.

Next, a configuration example of the scattered intensity measurement device 20 according to the embodiment will be described with reference to FIG. 3. FIG. 3 is a schematic diagram illustrating an example of a configuration of the scattered intensity measurement device 20 according to the embodiment.

As illustrated in FIG. 3, the scattered intensity measurement device 20 includes a condition setting unit 21, an X-ray tube 22, a light source control unit 23, a divergence slit 24, a two-dimensional detector 25, a data processing unit 26, a transmission unit 27, a stage 28, and a stage control unit 29. An X direction and a Y direction illustrated in FIG. 3 are directions parallel to a surface of the stage 28 and are perpendicular to each other. A Z direction illustrated in FIG. 3 is a direction perpendicular to the surface of the stage 28. A rotation axis K illustrated in FIG. 3 is a rotation axis of the stage 28 on an XY plane.

A substrate W supported on the stage 28 is, for example, a semiconductor substrate such as a silicon substrate, a glass substrate, an alumina substrate, or another substrate, and has a periodic structure in which unit structures are arranged at a predetermined period on an upper surface.

The condition setting unit 21 sets conditions for scattered intensity measurement according to an instruction input from the user or the like. Examples of the conditions for the scattered intensity measurement include an incident angle (elevation angle) of the X-ray with respect to the XY plane, an incident angle (incident azimuth) of the X-ray within the XY plane, an X-ray wavelength, a divergence slit width, and a measurement time.

The X-ray tube 22 generates an X-ray beam X1, and irradiates the surface of the substrate W on the stage 28 with the beam X1.

The light source control unit 23 acquires the conditions of the scattered intensity measurement from the condition setting unit 21, and controls operations of the X-ray tube 22, the divergence slit 24, the stage 28, and the like according to the conditions.

Accordingly, the light source control unit 23 controls an irradiation direction of the X-ray on the substrate W, for example. The irradiation direction of the X-ray includes the elevation angle which is the incident angle of the X-ray with respect to the XY plane, and the azimuth angle (incident azimuth) which is the incident angle of the X-ray within the XY plane.

The light source control unit 23 controls the elevation angle of the X-ray by controlling the operation of the X-ray tube 22, for example. The light source control unit 23 controls the azimuth angle of the X-ray by rotating the stage 28 around the rotation axis K, for example. The light source control unit 23 may control the azimuth angle of the X-ray by changing a position of the X-ray tube 22 or the divergence slit 24, for example.

The divergence slit 24 decides an irradiation area of the X-ray on the surface of the substrate W under the control of the light source control unit 23. An optical path of the X-ray generated by the X-ray tube 22 is adjusted by a concave mirror in the X-ray tube 22. The X-ray is transmitted through the divergence slit 24, and is incident on a measurement point on the substrate W at a desired elevation angle and a desired azimuth angle.

The two-dimensional detector 25 includes a plurality of light receiving units (not illustrated) arranged in a two-dimensional direction. The light receiving unit is, for example, a detection element that detects the X-ray. Accordingly, the two-dimensional detector 25 detects an outgoing wave X2 of the X-rays reflected from the surface of the substrate W and scattered in an azimuth angle direction and an elevation angle direction. The two-dimensional detector 25 sends a detection result to the data processing unit 26.

The scattered intensity of the outgoing wave X2 of the X-ray is detected by the two-dimensional detector 25, and thus, a turn around time (TAT) of the scattered intensity measurement can be improved. However, the scattered intensity measurement device 20 may include a zero-dimensional detector that detects the scattered intensity by a point or a one-dimensional detector that detects the scattered intensity by a line instead of the two-dimensional detector 25.

The data processing unit 26 creates a two-dimensional scattered intensity image indicating an intensity distribution of the outgoing wave X2 from the detection result of the outgoing wave X2 of the X-ray by the two-dimensional detector 25, and sends the created two-dimensional scattered intensity image to the transmission unit 27.

The transmission unit 27 uses the two-dimensional scattered intensity image acquired from the data processing unit 26 as the scattered intensity data, and transmits the scattered intensity data together with the measurement conditions used for acquiring the two-dimensional scattered intensity image to the shape calculation device 10.

The stage 28 supports the substrate W such that the periodic structure of the substrate W faces upward.

The stage control unit 29 controls the operation of the stage 28 according to an instruction of the light source control unit 23. For example, the stage control unit 29 moves the stage 28 in the X direction, the Y direction, and the Z direction, and rotates the stage 28 about the rotation axis K. Accordingly, the azimuth angle of the X-ray to the substrate W supported by the stage 28 can be changed.

Measurement Example of Scattered Intensity

Figure 4:
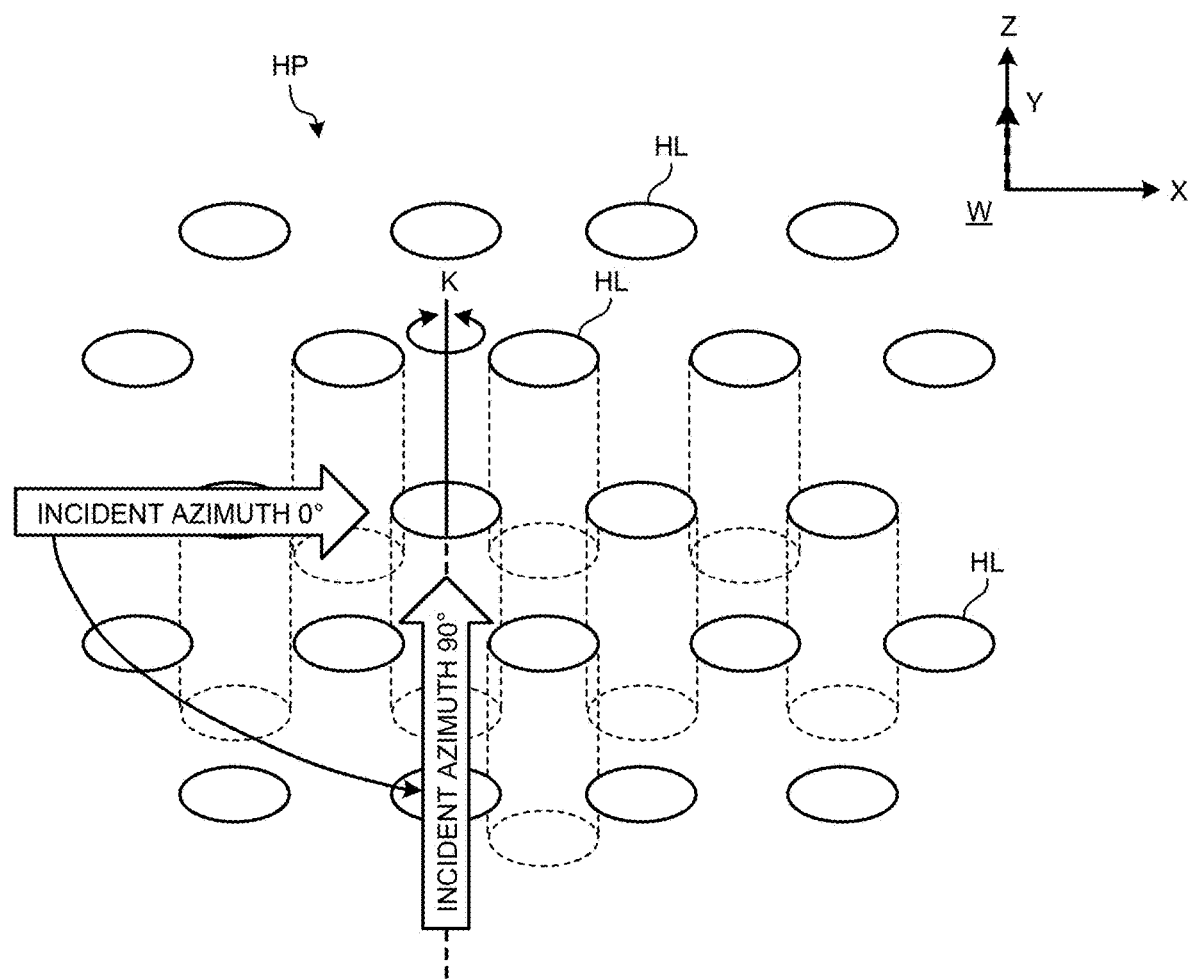
FIG. 4 is a diagram describing an example of a method of measuring scattered intensity using the scattered intensity measurement device according to the embodiment.

Next, a measurement example of the scattered intensity using the scattered intensity measurement device 20 according to the embodiment will be described with reference to FIG. 4. FIG. 4 is a diagram describing an example of a method of measuring the scattered intensity by the scattered intensity measurement device 20 according to the embodiment.

The periodic structure of the substrate to be measured may be a one-dimensional periodic structure such as a line and space (LS) pattern or a two-dimensional periodic structure such as a hole pattern or a pillar pattern. In the example of FIG. 4, the substrate W has a hole pattern HP.

As illustrated in the perspective view of FIG. 4, in the hole pattern HP of the substrate W, a plurality of holes HL is spread in a matrix (periodical) shape on the XY plane (two-dimension). At this time, information on a vertical cross section of the hole HL which is a unit structure can be acquired from the information on the scattering angle and the scattered intensity with respect to the incident azimuth of the X-ray on the hole HL.

Thus, in the case of the two-dimensional periodic structure such as the hole pattern HP, information on a plurality of cross sections of the hole HL can be acquired by changing the incident direction of the X-ray of the scattered intensity measurement device 20. For example, when the shape of each hole HL is regarded as 4-fold symmetry and the azimuth angle of the X-ray is changed by 90°, information on the cross-sectional shape of the entire circumference of the hole HL can be obtained.

The light source control unit 23 of the scattered intensity measurement device 20 rotates the stage 28 around, for example, the rotation axis K while irradiating the hole pattern HP with the X-ray or changes the azimuth angle of the X rays by, for example, 90° by changing the position of the X-ray tube 22 or the divergence slit 24. Accordingly, the X-rays incident on the hole pattern HP at different azimuth angles are reflected from the surface of the hole pattern HP, and the outgoing wave scattered at a predetermined intensity is generated.

The information on the scattering angle and the scattered intensity including the information on the cross-sectional shape of the entire circumference of the hole HL is detected by the two-dimensional detector 25 of the scattered intensity measurement device 20, and is converted into the two-dimensional scattered intensity image by the data processing unit 26.

Functional Example of Shape Calculation Device

Next, a detailed functional example of the shape calculation device 10 according to the embodiment will be described with reference to FIGS. 5 to 10.

Figure 5:
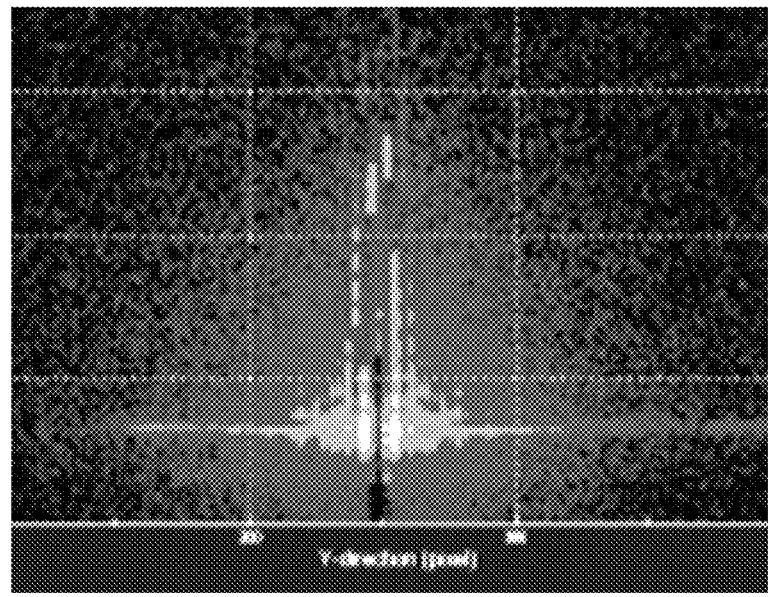
FIG. 5 is a diagram illustrating an example of a two-dimensional scattered intensity image acquired by the shape calculation device according to the embodiment.

FIG. 5 is a diagram illustrating an example of the two-dimensional scattered intensity image acquired by the shape calculation device 10 according to the embodiment. As illustrated in FIG. 5, the shape calculation device 10 acquires the two-dimensional scattered intensity image created from the data detected by the scattered intensity measurement device 20 from the scattered intensity measurement device 20.

In the two-dimensional scattered intensity image, the outgoing waves of the X-rays scattered by the hole pattern HP interfere with each other. Thus, for example, a diffraction peak appears in the azimuth angle direction, and an interference fringe appears in the elevation angle direction for each diffraction peak. Such a two-dimensional scattered intensity image includes information on a hole dimension (hole diameter) in a horizontal direction or the like, and information on a hole depth in a vertical direction or the like of the hole pattern HP. For example, a periodic structure on the substrate W is reflected in a characteristic interference pattern of the two-dimensional scattered intensity image.

The profile generation unit 12 of the shape calculation device 10 generates the scattering profile by digitizing the two-dimensional scattered intensity image, for example. At this time, the profile generation unit 12 generates the scattering profile in which data necessary for the shape calculation is extracted from the two-dimensional scattered intensity image based on layout information of the periodic structure to be measured.

For example, in the case of the hole pattern HP, the layout information of the periodic structure includes a pitch between the holes HL and an arrangement position of each hole HL. The extraction of the data corresponding to the layout information is performed based on the profile generation condition which is one of the setting information input to the input unit 11 and stored in the storage unit 19.

Figure 6:
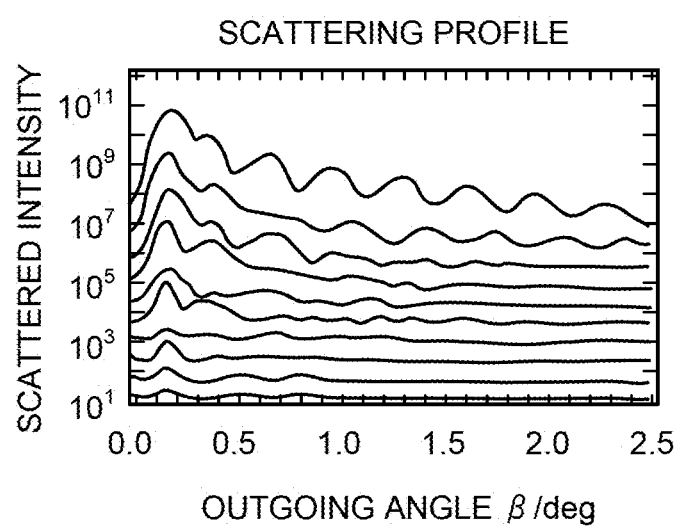
FIG. 6 is a diagram illustrating an example of a scattering profile generated by the shape calculation device according to the embodiment.

FIG. 6 is a diagram illustrating an example of the scattering profile generated by the shape calculation device 10 according to the embodiment. As illustrated in FIG. 6, the scattering profile is represented, for example, in a graph in which a horizontal axis represents an outgoing angle β/deg of the outgoing wave with respect to the XY plane and a vertical axis represents the scattered intensity of the outgoing wave. The scattering profile includes a plurality of curves on this graph.

Meanwhile, the simulation unit 13 of the shape calculation device 10 generates at least one scattering profile corresponding to the scattering profile through simulation in order to perform fitting with the scattering profile based on the actual measurement value.

In the generation of the scattering profile, the simulation unit 13 creates at least one structural model having a shape that the periodic structure on the substrate W may have. When the X-ray irradiation conditions actually applied to the substrate W are used, the simulation unit 13 simulates the scattering profile obtained from the structural model.

The fitting unit 16 performs fitting between at least one scattering profile obtained by the simulation and the scattering profile based on the actual measurement value. The shape identification unit 17 identifies the shape of the periodic structure of the substrate W based on this fitting result.

Details of the generation of the structural model and the fitting of the scattering profiles will be described later.

As described above, the measurement or the simulation is performed for the two-dimensional periodic structure such as the hole pattern HP by changing the azimuth angle of the X-ray in a wide range of 0° to 90°. Thus, the number of curves of the scattering profile obtained through the actual measurement and the scattering profile obtained through the simulation are both very large. As a result, a load may be applied to the fitting of these scattering profiles, and the accuracy of the fitting may be reduced.

Accordingly, the shape calculation device 10 calculates the shape on the substrate W by identifying factors that better reflect the shape to be measured, extracting, as the factors of interest, these factors from the scattering profile, and narrowing down information to be analyzed.

In order to identify the factors of interest, the shape calculation device 10 changes the shape of the virtually constructed structural model, simulates the scattering profiles corresponding to the changed shapes, and compares these scattering profiles. The details will be described below.

Figure 7:
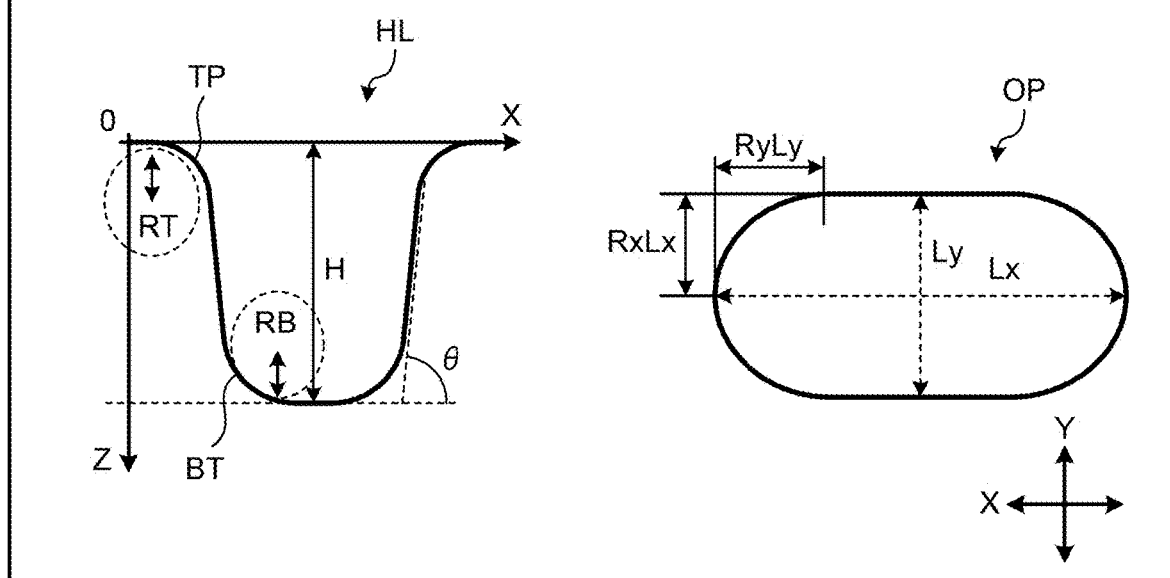
FIG. 7 is a diagram illustrating an example of a structural model constructed by the shape calculation device according to the embodiment and a setting value of a shape parameter used for constructing the structural model.

FIG. 7 is a diagram illustrating an example of a structural model MD constructed by the shape calculation device 10 according to the embodiment and a setting value PR of the shape parameter used for constructing the structural model MD.

As described above, the setting value PR of the shape parameter is one of the setting information input to the input unit 11 and stored in the storage unit 19. The setting value PR of the shape parameter is referred to when the shape calculation device 10 constructs the structural model MD, for example. The setting value PR of the shape parameter is an argument when the shape of the structural model MD is changed.

In constructing the structural model MD and changing the shape, virtual structure data is used in addition to the setting value PR of the shape parameter. As described above, the virtual structure data is one of the setting information input to the input unit 11 and stored in the storage unit 19. A position to which a numerical value of the setting value PR of the shape parameter is to be applied is defined in the virtual structure data in the structural model (virtual structure) MD such as the hole HL. The structural model MD is constructed by applying the numerical value of the setting value PR of the shape parameter to the virtual structure data, and the shape can be changed.

In the shape calculation device 10, the shape of the periodic structure is calculated for, for example, the cross-sectional shape of the unit structure constituting the periodic structure, and the cross-sectional shape of the unit structure is defined by various parameters. FIG. 7 is an example of the structural model MD and the setting value PR of the shape parameter when the periodic structure is the hole pattern HL.

As illustrated in FIG. 7, for example, in the case of the hole pattern HL, the unit structure is the hole HL, and, for example, a hole depth H (Height), a taper angle θ (side wall angle), diameters Lx and Ly of an opening OP, curvatures RxLx and RyLy of the opening OP, a rounding radius RT of an opening edge (top rounding radius), and a rounding radius RB of a bottom edge (bottom rounding radius) are included as the parameters related to the cross-sectional shape of the hole HL in the setting value PR of the shape parameter.

The hole depth H included in the setting value PR of the shape parameter is a distance from an upper end to a lower end of the hole HL, and the taper angle θ is an inclination angle of a side wall of the hole HL.

In the example of FIG. 7, the opening OP has an elliptical shape (oval shape), the diameter Lx of the opening OP indicates the diameter (large diameter) in the X direction, and the diameter Ly of the opening OP indicates the diameter (small diameter) in the Y direction. Four corners of the elliptical opening OP have a curved shape. Thus, in order to define the shape of such an elliptical opening OP, a distance from a point at which a side extending in the X direction turns into a curved shape to an end of the opening OP in the X direction is defined as the curvature RxLx of the opening OP. Similarly, a distance from a point at which a side extending in the Y direction turns into a curved shape to an end of the opening OP in the Y direction is defined as the curvature RyLy of the opening OP.

The opening edge, that is, a connection portion TP between an upper surface of the substrate W in which the hole HL is formed and the side wall of the hole HL may have a rounded curved surface shape depending on the processing conditions or the like. Thus, a radius of a circle inside the curved surface shape is defined as the rounding radius RT of the opening edge indicating a curved surface shape of an upper surface of the hole HL. The bottom edge, that is, a connecting portion BT between a bottom surface of the hole HL and the side wall of the hole HL may also have a rounded curved surface shape depending on the processing conditions. Thus, similarly to the rounding radius RT of the opening edge, a radius of a circle inside the curved surface shape of the bottom surface is defined as the rounding radius RB of the bottom edge indicating a curved surface shape of the bottom surface.

The simulation unit 13 of the shape calculation device 10 constructs the structural model MD by using, for example, the setting value PR of the shape parameter and the virtual structure data. When a plurality of numerical values is set as the setting value PR of the shape parameter, a median value is used as one shape parameter. As described above, the structural model MD to which the median value of the setting values PR of the shape parameters is applied may have, for example, an ideal shape based on a design value of the periodic structure on the substrate W or a standard shape which is a usual shape of the periodic structure on the substrate W.

In the shape calculation device 10, at least one of the shape parameters that define the cross-sectional shape of the hole HL that is the unit structure is selected as a target to be measured, and the factors of interest are identified for all the selected shape parameters.

The simulation unit 13 changes the setting values of the shape parameters selected as the target to be measured based on the numerical value of the setting value PR of the shape parameter, and generates a plurality of structural models having shapes corresponding to the changed setting values. At this time, the median value is selected for shape parameters other than the target to be measured. In the example of FIG. 7, it is assumed that the hole depth H, the rounding radius RT of the opening edge, and the rounding radius RB of the bottom edge are selected as the target to be measured.

As the simulation unit 13 changes the hole depth H from 45 nm to 55 nm according to the setting value PR of the shape parameter, and accordingly, for example, a structural model having a hole depth H shallower and a structural model deeper than the hole depth of the structural model MD constructed by using the median value are generated.

As the simulation unit 13 changes the rounding radius RT of the opening edge from 0 nm to 10.0 nm according to the setting value PR of the shape parameter, and accordingly, for example, a structural model having a more angular opening edge and a more rounded structural model than the structural model MD constructed by using the median value are generated.

As the simulation unit 13 changes the rounding radius RB of the bottom edge from 0 nm to 10.0 nm according to the setting value PR of the shape parameter, and accordingly, for example, a structural model having a more angular bottom edge and a more rounded structural model than the structural model MD constructed by using the median value are generated.

As described above, the shape of the periodic structure on the substrate W varies depending on the processing conditions, sudden events, and the like. It is preferable that the variable of the setting value PR of the shape parameter applied to the structural model is decided within a range in which the shape on the substrate W can actually vary, for example.

FIG. 8 is a diagram illustrating a procedure of deriving matrix data from the scattering profiles generated by the shape calculation device 10 according to the embodiment.

As illustrated in FIG. 8, the simulation unit 13 generates the scattering profiles corresponding to the shapes of the plurality of structural models by the simulation for the plurality of structural models generated as described above including the structural model MD using the median value.

When the number of shape parameters selected as the target to be measured is n, the scattering profile is expressed by, for example, an n-th degree equation. The factor-of-interest identification unit 14 of the shape calculation device 10 identifies the factors of interest by capturing, for example, the scattering profile as matrix data including the scattered intensity at the outgoing angle in each degree. Here, the numerical value of each factor of the matrix data indicates the scattered intensity. In other words, the scattered intensity is stored in each factor of the matrix data. The factor-of-interest identification unit 14 obtains correlation coefficients of the shape parameters to be measured from a degree of variation of the scattered intensity indicated by each factor of the matrix data according to a change of the setting value.

Figure 9A:
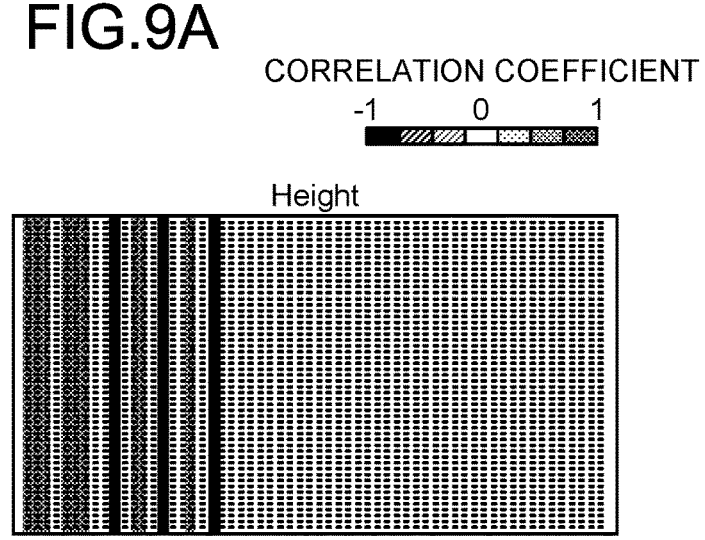
FIGS. 9A to 9C are diagrams illustrating examples of matrix data indicating a magnitude relationship between correlation coefficients of each factor for a change of the shape parameter obtained by the shape calculation device according to the embodiment.
Figure 9B:
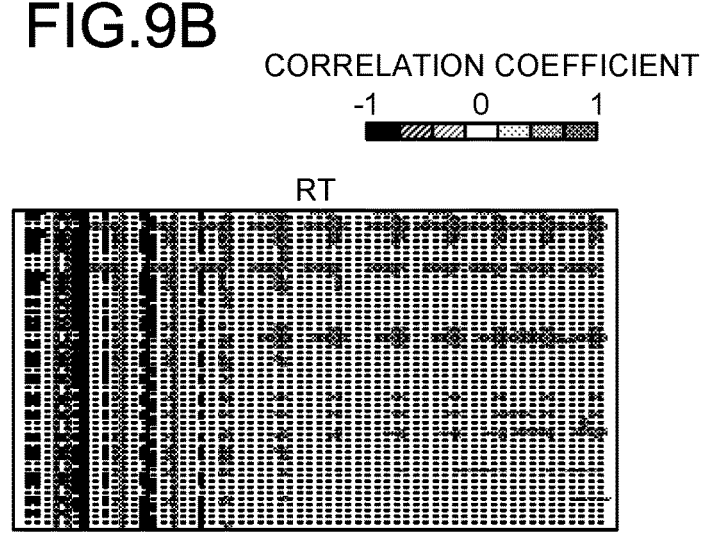
Figure 9C:
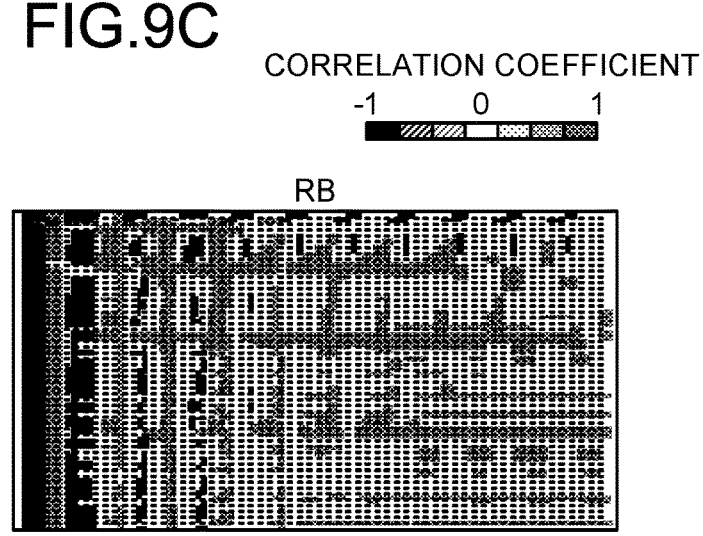

FIGS. 9A to 9C are diagrams illustrating examples of the matrix data indicating a magnitude relationship between the correlation coefficients of each factor for a change of the shape parameter obtained by the shape calculation device 10 according to the embodiment.

FIG. 9A is the matrix data illustrating the correlation coefficient of each factor for the change of the shape parameter when the shape parameter is the hole depth H. FIG. 9B is the matrix data illustrating the correlation coefficient of each factor for the change of the shape parameter when the shape parameter is the rounding radius RT of the opening edge. FIG. 9C is the matrix data illustrating the correlation coefficient of each factor for the change of the shape parameter when the shape parameter is the rounding radius RB of the bottom edge.

In each matrix data illustrated in FIGS. 9A to 9C, each factor is shaded due to a difference in the magnitude of the correlation coefficient of each factor when the shape parameter to be measured is changed. Each factor indicates a correlation coefficient having a predetermined magnitude within a range of −1 to +1. In each matrix data, as an absolute value of the correlation coefficient becomes larger, that is, the absolute value becomes closer to −1 or +1, the factor becomes darker.

The factor-of-interest identification unit 14 identifies, as the factors of interest for the shape parameter, the factors of which the correlation coefficients for the change of the shape parameter are equal to or more than a predetermined value. That is, the factors of interest correspond to the factors indicated by darkness of a predetermined concentration or more in each matrix data illustrated in FIGS. 9A to 9C, and are factors that are dominant in the analysis of the shape parameter to be measured.

Figure 10:
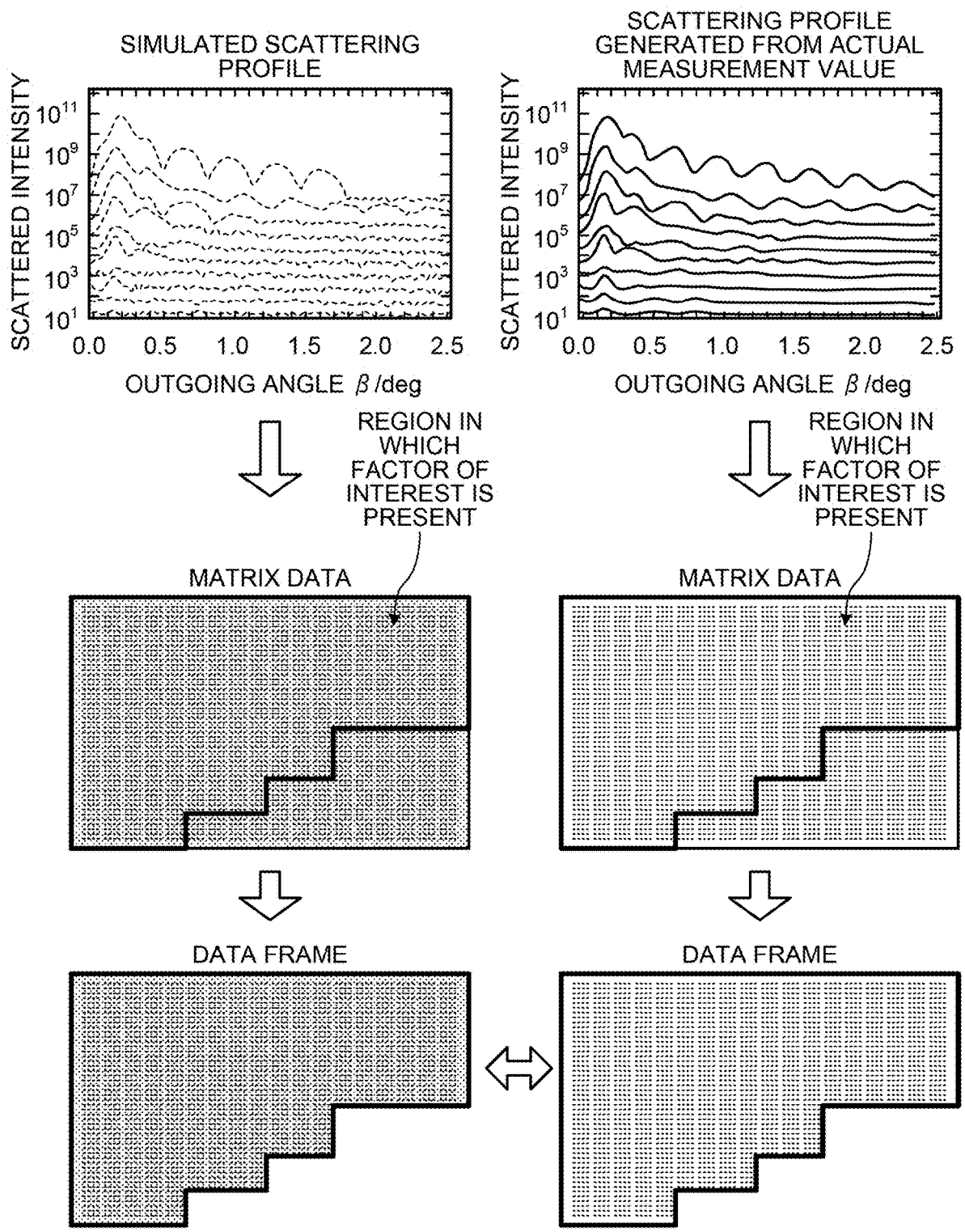
FIG. 10 is a diagram illustrating a procedure in which the shape calculation device according to the embodiment creates a data frame from the scattering profile and performs fitting.

FIG. 10 is a diagram illustrating a procedure in which the shape calculation device 10 according to the embodiment creates the data frame from the scattering profile and performs fitting.

As illustrated in FIG. 10, the data frame creation unit 15 of the shape calculation device 10 creates the data frame used for fitting when the factors of interest are identified.

That is, the data frame creation unit 15 creates the data frame by extracting the factors of interest from the scattering profile generated through actual measurement by the profile generation unit 12 based on the information on the factors of interest identified by the factor-of-interest identification unit 14.

In the examples of FIGS. 9A to 9C, the data frame is constructed by extracting the factor of the region corresponding to the region indicated by the darkness having the predetermined density or more of the matrix data in which each factor is shaded from the scattering profile based on the actual measurement value for the predetermined shape parameter to be measured. As described above, the data frame is a set of factors of interest that are dominant in the analysis of the predetermined shape parameter to be measured.

However, in the examples of FIGS. 9A to 9C and 10, the creation of the data frame from the scattering profile does not always mean that the data frame creation unit 15 create the data frame by converting the scattering profile to the matrix data and then extracting the factors of interest. The scattering profile and the matrix data generated from the scattering profile are substantially equivalent. When the factors of interest are extracted, the factors of interest may be directly extracted from the scattering profile, or the factors of interest may be indirectly extracted from the matrix data generated based on the scattering profile, as appropriate.

The generation of the data frame is equivalent to regeneration of the scattering profile by directly extracting the factors of interest from the scattering profile. In this case, the data frame may be acquired as the form of the scattering profile. Alternatively, the data frame may be acquired as the form of the matrix data constructed by indirectly extracting the factors of interest from the scattering profile via the matrix data.

The data frame creation unit 15 creates the data frame from the scattering profile based on the simulation generated by the simulation unit 13 as in a case where the data frame based on the actual measurement value is created. The scattering profile based on the simulation is generated based on at least one structural model having a shape that the periodic structure on the substrate W may have when the scattering profile for identifying the factors of interest is generated.

The fitting unit 16 of the shape calculation device 10 performs fitting between the data frame based on the actual measurement value and the data frame based on the simulation, and calculates the fitting residue as the fitting result. The fitting residue can be obtained by calculating differences between the scattered intensities indicated by the factors (factors of interest) included in these data frames between the data frame based on the actual measurement value and the data frame based on the simulation and obtaining the sum of the differences in the scattered intensities.

The shape identification unit 17 of the shape calculation device 10 identifies the shape of the periodic structure on the substrate W based on the fitting result. For example, when the fitting is performed between the data frame based on the actual measurement value and a plurality of data frames based on the simulation and there is a plurality of fitting results, the shape identification unit 17 selects the data frame of which the fitting residue included in the fitting result is minimum among the plurality of data frames based on the simulation. The shape identification unit 17 identifies, as the shape of the periodic structure on the substrate W, the shape of the structural model that is the source of the data frame.

Even when the fitting is performed between the data frame based on the actual measurement value and only one data frame based on the simulation, the shape identification unit 17 may present, as the result of the shape analysis, by determining whether or not the shape corresponding to the data frame may be the shape of the periodic structure on the substrate W from the value of the fitting residue.

Example of Shape Calculation Processing

Next, an example of shape calculation processing using the shape calculation system 1 according to the embodiment will be described with reference to FIG. 11. FIG. 11 is a flowchart illustrating an example of a procedure of the shape calculation processing performed by the shape calculation system 1 according to the embodiment.

As illustrated in FIG. 11, the shape calculation processing using the shape calculation system 1 has, for example, five phases. That is, the five phases of the shape calculation processing are processing of actually measuring the periodic structure on the substrate W (steps S101 to S102), processing of generating the data frame for fitting based on the actual measurement value (steps S201 to S202), processing of generating the data frame for fitting based on the simulation (steps S211 to S215), processing of identifying the factors of interest (steps S211 to S214), and processing of analyzing the shape of the periodic structure on the substrate W (steps S231 to S233).

As described above, the processing of identifying the factors of interest is included in the processing of generating the data frame for fitting based on the simulation, and is performed in the procedure of generating the data frame for fitting based on the simulation.

Here, any of the processing of step S201 in the processing of generating the data frame for fitting based on the actual measurement value and the processing of generating the data frame for fitting based on the simulation may be performed first, or the processing of both phases may be performed in parallel.

The processing of identifying the factors of interest may be performed at any timing until the generation of the data frame based on the actual measurement value is started after the measurement conditions used for the actual measurement of the periodic structure on the substrate W are decided.

First, the processing of actually measuring the periodic structure on the substrate W will be described.

The condition setting unit 21 of the scattered intensity measurement device 20 decides the measuring conditions used for the scattered intensity measurement according to the instruction input from the user, for example (step S101). In deciding the measurement conditions, the incident angle of the X-ray on the substrate W is decided. The transmission unit 27 transmits the decided measurement conditions to the shape calculation device 10.

The light source control unit 23 controls each unit of the scattered intensity measurement device 20 according to the decided measurement conditions, and the two-dimensional detector 25 acquires the scattered intensity data of the outgoing wave of the X-rays obtained from the periodic structure on the substrate W (step S102). The transmission unit 27 transmits the scattered intensity data to the shape calculation device 10.

Next, the processing of identifying the factors of interest will be described.

The simulation unit 13 of the shape calculation device 10 constructs the structural model MD having the median value of the shape parameters by using the virtual structure data and the setting value PR of the shape parameter (step S211). That is, the structural model MD is decided depending on how the median value of the shape parameters is set. As described above, for example, an ideal shape based on the design value of the periodic structure on the substrate W or a standard shape that the periodic structure on the substrate W may usually have are set to the structural model MD. That is, the virtual structure data and the setting value PR of the shape parameter used here are set to values indicating, for example, the ideal shape or the standard shape in design.

The simulation unit 13 decides the numerical value to be used as the setting value of the shape parameter to be measured among the shape parameters that define the constructed structural model MD by using the virtual structure data and the setting value PR of the shape parameter, and applies the decided numerical value to the structural model MD (step S212). Accordingly, a plurality of structural models having different shapes is generated by using the structural model MD as a reference.

As described above, the shape of the periodic structure on the substrate W varies depending on the processing conditions, sudden events, and the like. It is preferable that the setting value of the shape parameter applied to the structural model MD is decided within a range in which the shape on the substrate W can actually vary. Here, at least one setting value of the shape parameter is decided, and at least one structural model is generated based on the decided setting value.

The simulation unit 13 generates a plurality of scattering profiles obtained from the generated structural model through the simulation (step S213). At this time, the simulation unit 13 simulates the scattering profile based on the measurement conditions transmitted from the scattered intensity measurement device 20 and used for the actual measurement of the substrate W.

The factor-of-interest identification unit 14 identifies the factors of interest from the scattering profile generated by the simulation unit 13 (step S214). That is, for example, the factor-of-interest identification unit 14 identifies, as the factors of interest of the shape parameter, the factors of which the correlation coefficients for the change of the setting value of the shape parameter are equal to or more than a predetermined value from the plurality of scattering profiles corresponding to one shape parameter.

Next, the remaining processing of the processing of generating the data frame for fitting based on the simulation will be described.

The data frame creation unit 15 creates the data frame in which the factors of interest identified by the factor-of-interest identification unit 14 are extracted from the scattering profile generated by the simulation unit 13 for the shape parameter to be measured (step S215).

Next, the processing of generating the data frame for fitting based on the actual measurement value will be described.

The profile generation unit 12 extracts the data necessary for the shape analysis from the scattered intensity data measured by the scattered intensity measurement device 20, and generates the scattering profile (step S201).

The data frame creation unit 15 creates a data frame in which the factors of interest identified by the factor-of-interest identification unit 14 are extracted from the scattering profile generated by the profile generation unit 12 for the shape parameter to be measured (step S202). The data frame created here has a one-to-one correspondence with the data frame based on the simulation created in the processing of step S215. That is, the fitting can be performed between these data frames.

Next, the processing of analyzing the shape of the periodic structure on the substrate W will be described.

The fitting unit 16 performs fitting by applying the data frame based on the simulation created in the processing of step S215 to the data frame based on the actual measurement value created in the processing of step S202 (step S221).

When there is one data frame created in the processing of step S215, the fitting unit 16 performs fitting by applying the data frames created in the processing of step S202 and the data frames of step S215 in a one-to-one correspondence.

When there is a plurality of the data frames created in the processing of step S215, the fitting unit 16 obtains the fitting result for each of the data frames of step S215 by applying the data frames of step S215 to the data frames created in the processing of step S203 in a one by one.

The shape identification unit 17 identifies an actual shape of the periodic structure on the substrate W from the fitting residue obtained by the fitting unit 16 (step S222).

That is, when there is the plurality of data frames in step S215 and a plurality of fitting results is obtained, the shape identification unit 17 identifies the shape of the structural model corresponding to the data frame in step S215 in which the fitting residue is a minimum value, and uses the identified shape as the actual shape of the periodic structure on the substrate W.

When the number of the data frame in step S215 is one and only one fitting result is obtained, the shape identification unit 17 determines whether or not the shape of the structural model corresponding to the data frame can be decided to be the actual shape of the periodic structure on the substrate W from the value indicated by the fitting residue and the like, and uses the determination result as the result of the shape measurement.

The output unit 18 outputs the identified shape as the shape calculation result (step S223).

With the above, the shape calculation processing using the shape calculation system 1 according to the embodiment ends.

Comparative Example

In a shape calculation method according to a comparative example, a shape of a periodic structure on a substrate is decided by performing fitting between the scattering profile based on the actual measurement value and the scattering profile based on one or a plurality of simulations, for example. In other words, in the shape calculation method according to the comparative example, all the factors within the matrix data are equivalently handled, and fitting calculation is performed for all the factors.

In this case, when simulation values of a plurality of shape parameters are adjusted such that a difference in the scattered intensity of the scattering profile based on the simulation is smaller than the scattering profile based on the actual measurement value and the difference is equal to or less than a certain value, it is assumed that the structural model corresponding to the simulation value is the actual shape of the periodic structure on the substrate.

As described above, in the shape calculation method according to the comparative example, fitting is performed by using the plurality of shape parameters as variables such that the sum of differences in scattered intensity between the scattering profiles is minimized. Thus, these variables may reach many local extreme values (local minimum) in the middle stage. Accordingly, since it is difficult to reach a true value and it is difficult to determine whether or not any of these variables is an optimized extreme value (global minimum), the measurement accuracy of the shape is likely to deteriorate.

For the shape finally obtained, although it is possible to perform the determination by using an index such as an R factor (reliability factor) derived from the difference in the scattered intensity of the used scattering profile, this index simply indicates analysis accuracy of the entire obtained shape, and does not indicate analysis accuracy of a certain specific shape parameter. That is, in the shape calculation method according to the comparative example, it is difficult to know the analysis accuracy of each shape parameter even though the determination is performed by using the R factor.

In Patent Document 1 (Japanese Patent Laid-Open No. 2019-056568), when a structural model having a plurality of shape parameters as arguments is used, analysis is performed by using, as an initial value, a value measured using another measurement tool. Examples of another measurement tool include an SEM, and examples of a value measurable by the SEM include a ratio of a large diameter to a short diameter of the hole. However, the data obtained by the small angle scattering X-ray method includes information on shape parameters that are difficult to be obtained from the measurement using, for example, the SEM such as the rounding radius of the opening edge and the rounding radius of the bottom edge. As described above, of course, it is difficult to perform high-accuracy analysis on shape parameters for which high-accuracy measurement cannot be guaranteed by another measurement tool.

In Patent Document 2 (Japanese Patent Laid-Open No. 2017-053828), model fitting is performed by paying attention to an inflection point of the scattering profile. At this time, shape parameters such as the diameter of the opening, the diameter of the bottom surface, and the hole depth are likely to appear as inflection points of the scattering profile. However, there are shape parameters that are less likely to appear at the inflection points such as the rounding radius of the opening edge and the rounding radius of the bottom edge. It is difficult to perform high-accuracy analysis on such shape parameters. In the two-dimensional periodic structure such as the hole pattern, since the measurement is usually performed from a plurality of azimuth angles, it is difficult to associate the change of the shape parameter with the inflection point of the scattering profile.

In Patent Document 3 (Japanese Patent Laid-Open No. 2011-117894), a diffraction profile region that is likely to have sensitivity with respect to any parameter of interest is detected, and a measurement range and a loading time are optimized. However, it is difficult to identify a factor for the parameter of interest from the diffraction profile region.

In accordance with the shape calculation method and the like according to the embodiment, the data frames which are the sets of factors of interest for the shape parameters to be measured are created from the scattering profile obtained through the actual measurement and the scattering profile obtained through the simulation, and fitting is performed between these data frames. That is, not all the factors included in the scattering profile are analyzed, but only the factors of interest are analyzed. Thus, for example, when the measurement is performed from the plurality of azimuth angles for a multi-dimensional periodic structure, it is possible to select an appropriate measurement condition depending on a periodic axis to be rotated. Accordingly, the shape of the periodic structure on the substrate W can be calculated with high accuracy. The measurement throughput can be improved.

First Modification Example

Next, a shape calculation system according to a first modification example of the embodiment will be described with reference to FIGS. 12A to 12C. In the shape calculation system according to the first modification example, a method of identifying the factors of interest is different from the method of the aforementioned embodiment.

In the shape calculation system according to the first modification example, when the scattering profile is captured as the matrix data constituted by the scattered intensities, the factor-of-interest identification unit of the shape calculation device calculates a variation range of the scattered intensity indicated by each factor of the matrix data according to the change of the setting value for the shape parameter to be measured.

Figure 12A:
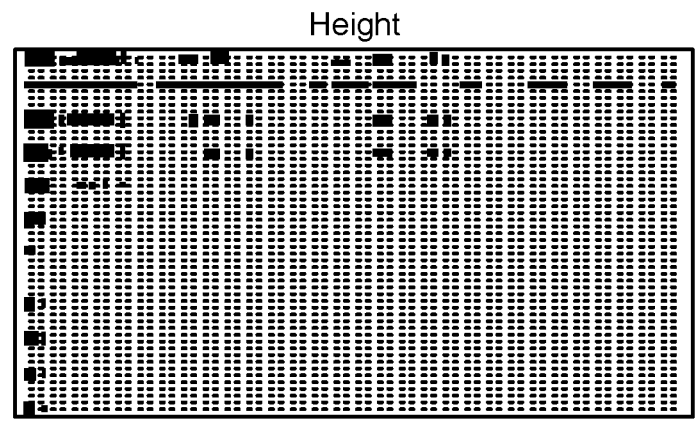
FIGS. 12A to 12C are diagrams illustrating examples of matrix data indicating a magnitude relationship between variation ranges of each factor for a change of a shape parameter obtained by a shape calculation device according to a first modification example of the embodiment.
Figure 12B:
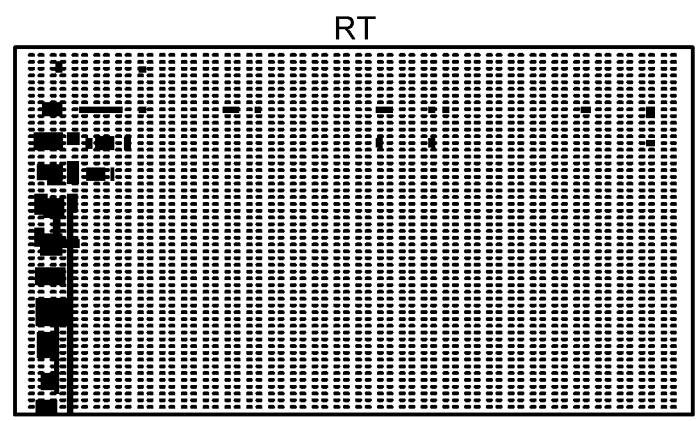
Figure 12C:
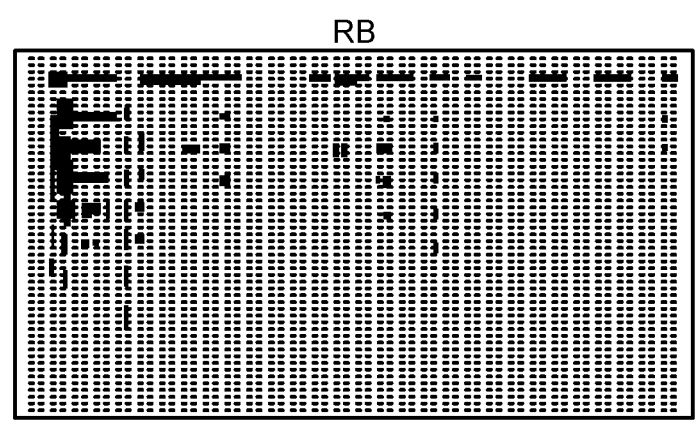

FIGS. 12A to 12C are diagrams illustrating examples of matrix data indicating a magnitude relationship between the variation ranges of each factor for the change of the shape parameter obtained by a shape calculation device according to the first modification example of the embodiment.

FIG. 12A is the matrix data illustrating the variation range of each factor for the change of the shape parameter when the shape parameter is the hole depth H. FIG. 12B is the matrix data illustrating the variation range of each factor for the change of the shape parameter when the shape parameter is the rounding radius RT of the opening edge. FIG. 12C is the matrix data illustrating the variation range of each factor for the change of the shape parameter when the shape parameter is the rounding radius RB of the bottom edge.

In each matrix data illustrated in FIGS. 12A to 12C, a factor having a large variation range of each factor when the shape parameter to be measured is changed is indicated in a dark color.

The factor-of-interest identification unit identifies, as the factors of interest for the shape parameter, factors of which the variation ranges for the change of the shape parameter are equal to or more than a predetermined value. That is, the factors of interest correspond to factors with color in each matrix data illustrated in FIGS. 12A to 12C, and are factors that are dominant in the analysis of the shape parameter to be measured.

In the shape calculation system according to the first modification example, fitting is performed by extracting the factors of interest identified in this manner from an original scattering profile and creating the data frame based on the actual measurement value and the data frame based on the simulation value.

In the examples of FIGS. 12A to 12C, it does not always mean that the data frame is created by converting the scattering profile into the matrix data and then extracting the factors of interest in creating the data frame from the scattering profile. The scattering profile and the matrix data generated from the scattering profile are substantially equivalent. When the factors of interest are extracted, the factors of interest may be directly extracted from the scattering profile, or the factors of interest may be indirectly extracted from the matrix data generated based on the scattering profile, as appropriate.

The generation of the data frame is equivalent to regeneration of the scattering profile by directly extracting the factors of interest from the scattering profile. In this case, the data frame may be acquired as the form of the scattering profile. Alternatively, the data frame may be acquired as the form of the matrix data constructed by indirectly extracting the factors of interest from the scattering profile via the matrix data.

In accordance with the shape calculation method and the like according to the first modification example, factors having large variation ranges for the change of the shape parameter to be measured are identified as the factors of interest. Accordingly, the shape of the periodic structure on the substrate can be calculated with high accuracy, and the measurement throughput can be improved.

Second Modification Example

Next, a shape calculation system according to a second modification example of the embodiment will be described with reference to FIG. 13. In the shape calculation system according to the second modification example, a timing at which the factors of interest are identified is different from the timing in the aforementioned embodiment.

Figure 13:
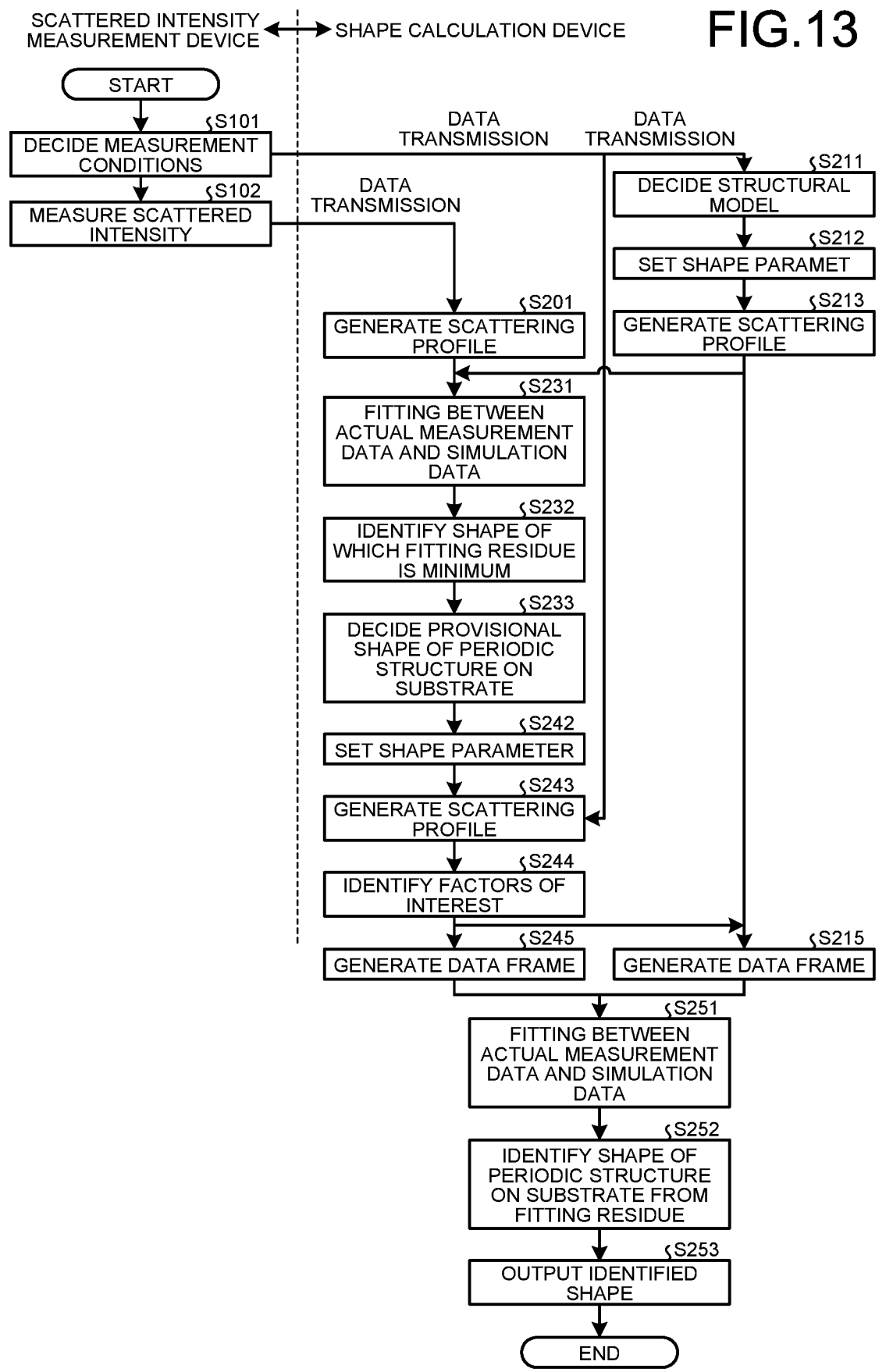
FIG. 13 is a flowchart illustrating an example of a procedure of shape calculation processing executed by a shape calculation system according to a second modification example of the embodiment.

FIG. 13 is a flowchart illustrating an example of a procedure of shape calculation processing executed by the shape calculation system according to the second modification example of the embodiment. As illustrated in FIG. 13, the shape calculation processing using the shape calculation system has, for example, eight phases.

That is, the eight phases of the shape calculation processing are processing of measuring the periodic structure on the substrate (steps S101 to S102), processing of generating the scattering profile for fitting based on the actual measurement value (step S201), processing of generating the data frame for fitting (step S245), processing of generating the scattering profile for fitting based on the simulation (steps S211 to S213), processing of generating the data frame for fitting (step S215), processing of deciding a provisional shape of the periodic structure on the substrate (steps S231 to S233), processing of identifying the factors of interest (steps S242 to S244), and processing of analyzing the shape of the periodic structure on the substrate (steps S251 to S253).

The actual measurement processing of the periodic structure on the substrate is performed similarly to the processing of steps S101 and S102 in FIG. 11 of the aforementioned embodiment.

The processing of generating the scattering profile for fitting based on the actual measurement value is performed similarly to the processing of step S201 in FIG. 11 of the aforementioned embodiment. The processing of generating the scattering profile for fitting based on the simulation is performed similarly to the processing of steps S211 to S213 in FIG. 11 of the aforementioned embodiment.

Next, the processing of deciding the provisional shape of the periodic structure on the substrate will be described.

The fitting unit of the shape calculation device according to the second modification example performs fitting by applying the scattering profile based on the simulation created in the processing of step S213 to the scattering profile based on the actual measurement value created in the processing of step S201 (step S231).

The shape identification unit identifies the shape of the structural model corresponding to the scattering profile of step S213 in which the fitting residue is the minimum value (step S232), and provisionally decides the identified shape as the actual shape of the periodic structure on the substrate (step S233).

Next, the processing of identifying the factors of interest will be described.

The simulation unit decides the numerical value to be used as the setting value of the shape parameter to be measured among the shape parameters that define the shape decided in the processing of step S233, and applies the decided numerical value to the provisional shape (step S242). Accordingly, a plurality of structural models having shapes different from the provisional shape is generated.

The simulation unit generates a plurality of scattering profiles obtained from the generated structural model through the simulation (step S243). At this time, the simulation unit performs the simulation of the scattering profile based on the measurement conditions transmitted from the scattered intensity measurement device and used for the actual measurement of the substrate.

The factor-of-interest identification unit identifies the factors of interest from the scattering profile generated by the simulation unit (step S244). That is, the factor-of-interest identification unit identifies, as the factors of interest of the shape parameter, factors having high contribution ratios to the change of the shape parameter from the plurality of scattering profiles corresponding to one shape parameter, for example.

Next, the processing of generating the data frame for fitting based on the actual measurement value and the processing of generating the data frame for fitting based on the simulation will be described.

The data frame creation unit creates the data frame in which the factors of interest identified by the factor-of-interest identification unit are extracted from the scattering profile generated by the profile generation unit for the shape parameter to be measured (step S245).

The data frame creation unit creates the data frame in which the factors of interest identified by the factor-of-interest identification unit are extracted from the scattering profile generated by the simulation unit for the shape parameter to be measured (step S215).

Next, the processing of analyzing the shape of the periodic structure on the substrate will be described.

The fitting unit performs fitting by applying the data frame based on the simulation created in the processing of step S215 to the data frame based on the actual measurement value created in the processing of step S245 (step S251).

The shape identification unit identifies the actual shape of the periodic structure on the substrate W from the fitting residue obtained by the fitting unit 16 (step S252).

The output unit outputs the identified shape as the shape calculation result (step S253).

With the above, the shape calculation processing using the shape calculation system according to the second modification example of the embodiment ends.

In accordance with the shape calculation method according to the second modification example, the shape of the periodic structure on the substrate is identified by performing the shape analysis in two steps, that is, the decision of the provisional shape and the identification of the actual shape on the substrate. Even in such a method, for example, the same effects as the effects of the shape calculation method according to the aforementioned embodiment are obtained unlike a case where the shape is decided only by a pre-defined refinement condition in a state in which the shape is completely unknown as in the comparative example.

Other Modification Examples

It has been described in the aforementioned embodiment and the first and second modification examples that the shape analysis is performed by obtaining the correlation coefficient or the variation range for each factor, extracting the factors of interest having high contribution ratios to the shape parameter to be measured, and performs fitting. However, for example, the shape analysis may be performed by weighting each factor by using the absolute value of the correlation coefficient of each factor or the variation range as a weighting factor and creating the data frame having the factors as the factors of interest.

Although it has been described in the aforementioned embodiment and the first and second modification examples that the scattered intensity measurement device 20 measures the scattered intensity data by using the beam of the X-rays, the beam used for the measurement may be electromagnetic waves or a particle beam other than the X-rays.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A non-transitory recording medium that records a shape calculation program causing a computer to execute:
    generating a first scattering profile obtained by irradiating a first structure on a substrate with an electromagnetic wave;
    generating a second scattering profile calculated based on a second structure, the second structure being a structure simulated;
    selecting at least a shape parameter, as a measuring target, from a plurality of shape parameters which define the second structure, and identifying factors of interest corresponding to the selected shape parameter among a plurality of factors from the second scattering profile, the plurality of factors being included in the second scattering profile and having information of scattered intensity;
    creating a first data frame by extracting the factors of interest from the first scattering profile;
    creating a second data frame by extracting the factors of interest from the second scattering profile;
    fitting the first data frame and the second data frame; and
    determining the shape of the first structure based on the fitting result.

2. The recording medium according to claim 1, wherein the first scattering profile is generated based on an outgoing wave of the electromagnetic wave which is obtained by causing the electromagnetic wave to be incident on the first structure and has a diffraction angle equal to or less than a predetermined angle.

3. The recording medium according to claim 2, wherein the first scattering profile is generated by measurement using a small angle scattering X-ray method.

4. The recording medium according to claim 1, wherein the first structure is a two-dimensional periodic structure.

5. The recording medium according to claim 4, wherein the first structure is a hole pattern or a pillar pattern periodically arranged.

6. The recording medium according to claim 1, wherein the second scattering profile is generated using the second structure in which a setting value of the selected shape parameter is changed; and
    the factors of interest are identified based on a degree of variation of the scattered intensity indicated by each the plurality of factors included in the second scattering profile according a change in the setting values.

7. The recording medium according to claim 6, wherein the shape calculation program causes the computer to execute:
    identifying factors as factors of interest in which correlation coefficients of each the plurality of factors included in the second scattering profile with respect to the change in the setting values of the shape parameter are equal to a predetermined value or more.

8. The recording medium according to claim 6, wherein the shape calculation program causes the computer to execute:
identifying factors as factors of interest in which variation ranges of each the plurality of factors included in the second scattering profile with respect to the change in the setting values of the shape parameter are equal to a predetermined value or more.

9. A shape calculation method executed by a shape calculation device, the method comprising:
generating a first scattering profile obtained by irradiating a first structure on a substrate with an electromagnetic wave;
generating a second scattering profile calculated based on a second structure, the second structure being a structure simulated;
selecting at least a shape parameter, as a measuring target, from a plurality of shape parameters which define the second structure, and identifying factors of interest corresponding to the selected shape parameter among a plurality of factors from the second scattering profile, the plurality of factors being included in the second scattering profile and having information of scattered intensity;
creating a first data frame by extracting the factors of interest from the first scattering profile;
creating a second data frame by extracting the factors of interest from the second scattering profile;
fitting the first data frame and the second data frame; and
determining the shape of the first structure based on the fitting result.

10. The shape calculation method according to claim 9, comprising
generating the first scattering profile based on an outgoing wave of the electromagnetic wave which is obtained by causing the electromagnetic wave to be incident on the first structure and has a diffraction angle equal to or less than a predetermined angle.

11. The shape calculation method according to claim 10, comprising
generating the first scattering profile by measurement using a small angle scattering X-ray method.

12. The shape calculation method according to claim 9, wherein
the first structure is a two-dimensional periodic structure.

13. The shape calculation method according to claim 12, wherein
the first structure is a hole pattern or a pillar pattern periodically arranged.

14. The shape calculation method according to claim 9, comprising:
the second scattering profile is generated using the second structure in which a setting value of the selected shape parameter is changed; and
the factors of interest are identified based on a degree of variation of the scattered intensity indicated by each the plurality of factors included in the second scattering profile according a change in the setting values.

15. The shape calculation method according to claim 14, comprising:
identifying factors as factors of interest in which correlation coefficients of each the plurality of factors included in the second scattering profile with respect to the change in the setting values of the shape parameter are equal to a predetermined value or more.

16. The shape calculation method according to claim 14, comprising:
identifying factors as factors of interest in which variation ranges of each the plurality of factors included in the second scattering profile with respect to the change in the setting values of the shape parameter are equal to a predetermined value or more.

17. A shape calculation device comprising:
a first profile generation unit that generates a first scattering profile obtained by irradiating a first structure on a substrate with an electromagnetic wave;
a second profile generation unit that generates a second scattering profile based on a second structure, the second structure being a structure simulated;
a factor-of-interest identification unit that selects at least a shape parameter, as a measuring target, from a plurality of shape parameters which define the second structure, and identifies factors of interest corresponding to the selected shape parameter among a plurality of factors from the second scattering profile, the plurality of factors being included in the second scattering profile and having information of scattered intensity;
a data frame creation unit that creates a first data frame by extracting the factors of interest from the first scattering profile, and creates a second data frame by extracting the factors of interest from the second scattering profile;
a fitting unit that performs fitting between the first data frame and the second data frame; and
a shape identification unit that determines the shape of the first structure based on a result of the fitting.

18. The shape calculation device according to claim 17, wherein
the second profile generation unit generates the second scattering profile using the second structure in which a setting value of the selected shape parameter is changed; and
the factor-of-interest identification unit identifies the factors of interest based on a degree of variation of the scattered intensity indicated by each the plurality of factors included in the second scattering profile according a change in the setting values.

19. The shape calculation device according to claim 18, wherein
the factor-of-interest identification unit identifies factors as factors of interest in which correlation coefficients of each the plurality of factors included in the second scattering profile with respect to the change in the setting values of the shape parameter are equal to a predetermined value or more.

20. The shape calculation device according to claim 18, wherein
the factor-of-interest identification unit identifies factors as factors of interest in which variation ranges of each the plurality of factors included in the second scattering profile with respect to the change in the setting values of the shape parameter are equal to a predetermined value or more.

* * * * *